US010422318B2

(12) United States Patent
Betran Palomas

(10) Patent No.: US 10,422,318 B2
(45) Date of Patent: Sep. 24, 2019

(54) WIND TURBINE BLADE

(71) Applicant: Alstom Renewable Technologies, Grenoble (FR)

(72) Inventor: Jaume Betran Palomas, Sant Cugat del Valles (ES)

(73) Assignee: GE RENEWABLE TECHNOLOGIES WIND B.V., Breda (NL)

(*) Notice: Subject to any disclaimer, the term of this patent is extended or adjusted under 35 U.S.C. 154(b) by 562 days.

(21) Appl. No.: 15/031,910

(22) PCT Filed: Oct. 23, 2014

(86) PCT No.: PCT/EP2014/072766
§ 371 (c)(1),
(2) Date: Apr. 25, 2016

(87) PCT Pub. No.: WO2015/059232
PCT Pub. Date: Apr. 30, 2015

(65) Prior Publication Data
US 2016/0265508 A1    Sep. 15, 2016

(30) Foreign Application Priority Data

Oct. 24, 2013 (EP) .................................... 13382425

(51) Int. Cl.
*F03D 7/02* (2006.01)
*F03D 1/06* (2006.01)

(52) U.S. Cl.
CPC ........... *F03D 7/022* (2013.01); *F03D 1/0641* (2013.01); *F03D 1/0675* (2013.01);
(Continued)

(58) Field of Classification Search
CPC ........ F03D 7/022; F03D 7/0236; F03D 7/024; F03D 7/0232; F05B 2240/31;
(Continued)

(56) References Cited

U.S. PATENT DOCUMENTS 9,458,825 B2 * 10/2016 Brooks ................... F03D 7/022
2007/0036653 A1 * 2/2007 Bak ....................... F03D 1/0641
416/98
(Continued)

FOREIGN PATENT DOCUMENTS

EP     2394911 A1    12/2011
WO  2004088130 A1   10/2004

OTHER PUBLICATIONS

PCT Search Report and Written Opinion issued in connection with corresponding PCT Application No. PCT/EP2014/072766 dated Nov. 14, 2014.
(Continued)

*Primary Examiner* — Ninh H. Nguyen
*Assistant Examiner* — Jesse M Prager
(74) *Attorney, Agent, or Firm* — Dority & Manning, P.A.

(57) ABSTRACT

Wind turbine blades comprising one or more deformable trailing edge sections having a multistable sheet comprising a plurality of bistable elements, each bistable element having two stable positions, wherein the multistable sheet is attached in a cantilever manner to a structural portion of the blade and extends in a chordwise direction, and the multistable sheet is connected to a skin of the blade such that upon changing one or more bistable elements from one stable position to the other stable position a shape of the trailing edge section changes. The application further relates to wind turbines comprising such blades and methods of controlling loads on the blades.

14 Claims, 3 Drawing Sheets

(52) U.S. Cl.
CPC ...... *F03D 1/0683* (2013.01); *F05B 2220/709* (2013.01); *F05B 2240/311* (2013.01); *F05B 2250/02* (2013.01); *F05B 2250/283* (2013.01); *F05B 2260/507* (2013.01); *F05B 2270/331* (2013.01); *F05B 2270/602* (2013.01); *F05B 2270/604* (2013.01); *F05B 2270/605* (2013.01); *F05B 2280/6012* (2013.01); *Y02E 10/721* (2013.01); *Y02E 10/723* (2013.01)

(58) Field of Classification Search
CPC ........................ F05B 2240/311; F05B 1/0675; F05B 1/0683; F05B 1/0641; F05B 2270/331; F05B 2270/322; F05B 2270/602; F05B 2270/604; F05B 2270/605; F05B 2270/709; F05B 2250/02; F05B 2250/283; F05B 2280/6012; F05B 2280/5006; F05B 2260/507; Y02E 10/721; Y02E 10/723
See application file for complete search history.

(56) References Cited

U.S. PATENT DOCUMENTS

| | | | |
|---|---|---|---|
| 2010/0247314 A1* | 9/2010 | Narasimalu | F03D 1/0675 416/146 R |
| 2011/0042524 A1* | 2/2011 | Hemmelgarn | B64C 3/48 244/203 |
| 2012/0169060 A1* | 7/2012 | Loh | F03D 1/0641 290/55 |
| 2013/0035878 A1* | 2/2013 | Wesby | F03D 7/042 702/42 |

OTHER PUBLICATIONS

"Advanced Shell Structures", Advanced Structures Group, University of Cambridge, pp. 1-4, 2013, http://www-g.eng.cam.ac.uk/advancedstructures/research.html, retrieved on Apr. 29, 2016.

* cited by examiner

WIND TURBINE BLADE

BACKGROUND

Embodiments of the present application relate to wind turbine blades comprising one or more deformable trailing edge sections and wind turbines comprising such blades. It further relates to methods of controlling loads on such wind turbine blades.

Modern wind turbines are commonly used to supply electricity into the electrical grid. Wind turbines generally comprise a rotor with a rotor hub and a plurality of blades. The rotor is set into rotation under the influence of the wind on the blades. The rotation of the rotor shaft drives the generator rotor either directly ("directly driven") or through the use of a gearbox. The gearbox (if present), the generator and other systems are usually mounted in a nacelle on top of a wind turbine tower.

Pitch systems are normally employed for adapting the position of the blades to varying wind conditions. In this respect, it is known in wind speeds above a nominal wind speed to rotate the position of each blade along its longitudinal axis in such a way that lift and drag are changed to reduce torque. This way, even though the wind speed increases, the torque transmitted by the rotor to the generator remains substantially the same. Using pitch systems may be particularly suitable for adapting the wind turbine blade to varying wind speeds.

Some other known systems change the aerodynamics of a wind turbine blade by providing the blade with a trailing edge flap hinged to a main body. However, deflecting the aerodynamic surface about a hinged point may lead to flow separation which may cause abrupt aerodynamic changes thus decreasing load and reducing efficiency of the wind turbine.

Document WO2004/088130 describes the control of aerodynamic forces substantially instantaneously and locally along the blades of a wind turbine rotor by continuous variation of the airfoil geometry in the leading edge region and trailing edge region along part or the whole blade span. It further describes the use of smart materials or mechanical actuators integrated in a deformable material changing the outer geometry in the leading and trailing edge region and thereby changing the blade section aerodynamic forces. However, energy consumption of these systems can be relatively high.

BRIEF DESCRIPTION OF THE INVENTION

It is an object of the present disclosure to provide an improved blade allowing variation of aerofoil geometry which is cost-effective.

In a first aspect a wind turbine blade is provided. The blade comprises one or more deformable trailing edge (DTE) sections. Each DTE has a multistable sheet comprising a plurality of bistable elements. Each bistable element has two stable positions. The multistable sheet is attached in a cantilever manner to a structural portion of the blade and extends in a chordwise direction, and the multistable sheet is further connected to a skin of the blade such that upon changing one or more bistable elements from one stable position to the other stable position a shape of the trailing edge section changes.

Throughout the description and claims, the term "deformable trailing edge (DTE)" is used for the portion of the blade (viewed in a chordwise direction) that spans approximately from the structural portion of the blade, for example the spar, to the trailing edge.

In this sense, "structural portion" is to be understood as a portion or component of the wind turbine blade that has as a main function to withstand and transmit loads and is relatively strong/stiff compared to other parts of the blade. The structural portion of the blade may typically include a spar such as for example, an I-beam spar, a spar box or a C-shape spar. A spar is typically provided in wind turbine blades to maintain the blade shape and it supports and transmits loads on the blades, in particular the blade bending loads.

According to this aspect, the blade aerofoil can locally adopt multiple shapes by switching each or several of the bistable elements between one stable position and the other stable position. This results in a fairly versatile blade, able to assume different blade shape configurations by means of a coordinated control of the bistable elements along the blade length, and thus compensate varying wind speeds. It is especially suitable to adapt blade shape to wind conditions that remain fairly stable for a relatively long period of time (in the range of minutes to hours). Furthermore, the method may also be applied for non-homogeneous wind fields over the wind turbine rotor such as wind shear, situations of "layered winds" or wind veer that result in substantially cyclical blade conditions. With a blade substantially as hereinbefore described, different load conditions may be tackled by alternating between the two stable positions of the bistable elements. Furthermore, each blade shape configuration is stable and can be achieved without continuing energy supply. It is thus also a cost-effective solution at least in terms of energy consumption.

A further effect produced by actuating different bistable elements is that a helical shape (twist) of the blade in a spanwise direction can also be changed. As it is known, wind turbine blades are designed having a certain helical shape in the spanwise direction in order to optimize the rotor torque. This enhances the blades' behavior under a certain wind speed range and "wind profile", assumed as standard. During operation wind speeds and wind profiles change and sometimes the blade is operating under wind conditions which differ significantly from the assumed standard. In these cases, varying the twist of the blade can enhance the operation of the blade and therewith the wind turbine. Again, the various blade shape configurations can be achieved without continuing energy supply.

In some embodiments, the multistable sheet may be a dimpled sheet and the bistable elements may be dimples provided along a surface of the multistable sheet. In these cases, each dimple may have a first stable position protruding from a first side of the sheet surface and a second stable position protruding from the other side of the sheet surface. Or put another way, the first stable position of each dimple may be that in which the dimple protrudes from a top side of the sheet, i.e. the convex side of the dimple points towards a suction side of the blade and the second stable position may be that in which the dimple protrudes from a bottom side of the sheet, i.e. a convex side of the dimple points towards a pressure side of the blade. The dimples remain at their stable position without the need for continuing energy supply. Energy is thus only required for changing from one stable position to the other.

Depending on the position of each dimple, tension is provided to the portions of the sheet in between the dimples. By changing the position of the dimples, the curvature of the sheet can be changed.

In some embodiments, the deformable trailing edge section may be provided at or near a tip of the blade. Optionally, the deformable trailing edge section may extend along approximately one third of the total length of the blade. The outer third of the blade is generally regarded as the part of the blade that has most effect on the torque of the wind turbine rotor. This is because the shape in that section of the blade is optimized in terms of its aerodynamic efficiency (contrary to e.g. the most inward section of the blade which is optimized more to support loads). Additionally, the outer section of the blade has the longest "lever arm" with respect to the rotor axis.

In some cases, the deformable trailing edge section may span in a chordwise direction from between 50% and 75% of the chord line of the blade section to the trailing edge (100% of the chord). In further cases, the deformable trailing edge section may extend from e.g. 25%, 30% or 40% of the chord to e.g. 100% of the chord, i.e. the trailing edge.

Depending on circumstances, the length of the deformable trailing edge section in the spanwise and chordwise directions respectively may be varied.

Another aspect provides a wind turbine comprising one or more blades substantially as hereinbefore described.

A further aspect provides a method of controlling a wind turbine blade substantially as hereinbefore described. The method may comprise measuring average loads on the blade at time intervals and changing one or more bistable elements from one stable position to the other stable position as a function of the measured average loads. Optionally, the time intervals for determining average loads may be predefined. Optionally, the time intervals may all be equally long.

In some cases, instead of measuring average loads, average wind conditions may be measured at time intervals. In these cases, measuring average wind conditions may comprise detecting wind shear, wind veer and/or situations of layered winds. These wind conditions create non-homogeneous wind fields over the wind turbine rotor.

Additional objects, advantages and features of embodiments of the present invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION

Figure 1:
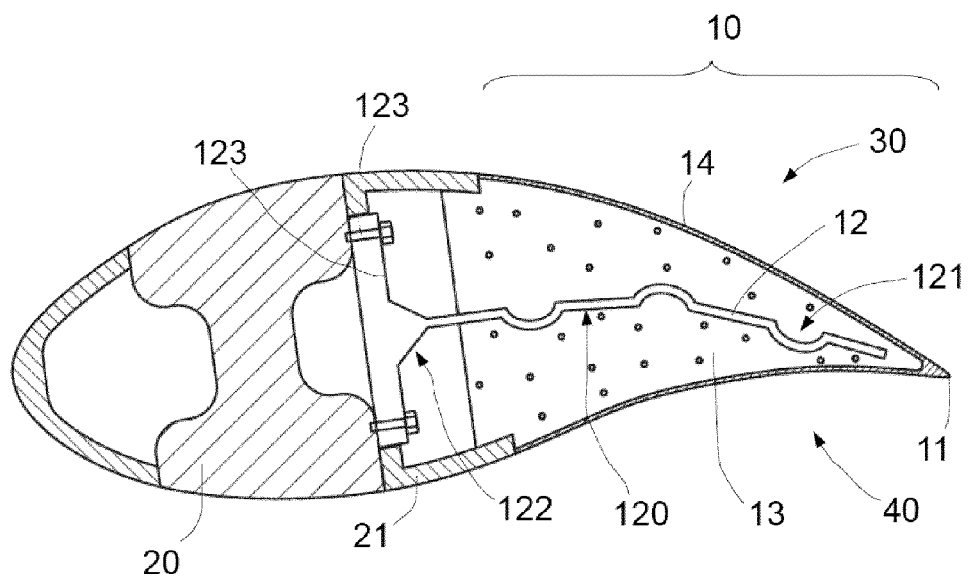
FIG. 1 shows a cross-sectional view of a wind turbine blade according to an embodiment.

FIG. 1 shows a cross-sectional view of a wind turbine blade. The blade may comprise a deformable trailing edge (DTE) section 10, and in particular a Continuous Deformable Trailing Edge (CDTE) section. The DTE 10 may extend from the spar 20 to the trailing edge 11 of the blade. The DTE 10 may comprise a dimpled sheet 12 having a surface 120. A plurality of dimples 121 may be provided along the sheet surface 120.

The dimples 121 may be provided with their convex side pointing towards either a suction side 30 or a pressure side 40 of the blade. Any of these positions are stable positions for the dimples. In this sense, a stable position means that no energy or force is necessary to maintain the dimples in these positions. In fact, a certain amount of force/energy above a threshold value would be necessary to change the dimple to another stable position.

The dimpled sheet 12 may be attached in a cantilever manner to the blade spar 20 and may extend in a chordwise direction towards the trailing edge 11 of the blade. The dimpled sheet in this case extends from approximately 40% of the chord to approximately 95% of the chord. Variations in length and exact position are possible.

An end 122 of the dimpled sheet may thus be adapted to be mounted to the blade spar 20. The attachment to the blade spar 20 may be done in any known manner such as for example providing a transverse plate 123 at the end 122 of the dimpled sheet and screwing the transverse plate 123 directly to the spar 20 with bolts 124. The attachment of the spar may vary depending on which kind of spar is used.

An inner portion of the DTE 12 may be filled with e.g. a foam 13 provided from the dimpled sheet 12 to a blade skin 14. The foam may thus connect the dimpled sheet 12 with the blade skin 14. In alternatives embodiments, other ways of connecting the dimpled sheet with the blade skin may be foreseen, for example anisotropic material, a honeycomb structure or even one or more substantially rigid bars. A honeycomb structure is a relatively lightweight material that if designed properly can display a desirable anisotropic behavior: it may be made to be relatively stiff in a direction substantially perpendicular to the chord line direction, i.e. it is stiff so as to maintain the aerofoil thickness and not deform under aerodynamic pressure. At the same time, it may be made to be more flexible in a direction substantially parallel to the chord line, thus allowing proper movement of the multistable sheet. In other implementations, instead of a honeycomb structure material, other kinds of lightweight materials having such anisotropic properties so as to permit an internal structural behavior may also be used.

A further rigid structure 21 may also be provided substantially tangential to an inner surface of a pressure side 40 of the blade skin and substantially tangential to an inner surface of a suction side 30 of the blade skin for supporting the blade skin. Alternatively, the local portion of the skin may be relatively stiff compared to the more deformable/flexible portion of the skin downstream thereof At least portions of the blade skin 14 of the DTE may be made of a relatively flexible material. In some cases even substantially the whole blade skin may be made of a relatively flexible material. This ensures deformability and smoothness of the blade surface upon changing any of the bistable elements. Elastic or elastomeric materials are example of materials that can confer relatively high flexibility so that cracks due to fatigue loads are reduced. This way, when the dimpled sheet is actuated, i.e. when one or more dimples are changed from one stable state to the other stable state, the dimpled sheet changes its outer shape in an effective manner. Such a change in the outer shape of the dimpled sheet may further be transferred to the blade skin thanks to the foam provided inside the DTE. In alternative embodiments, other ways of connecting the dimpled sheet to the blade skin such as rigid bars or similar may also be foreseen.

Figure 2:
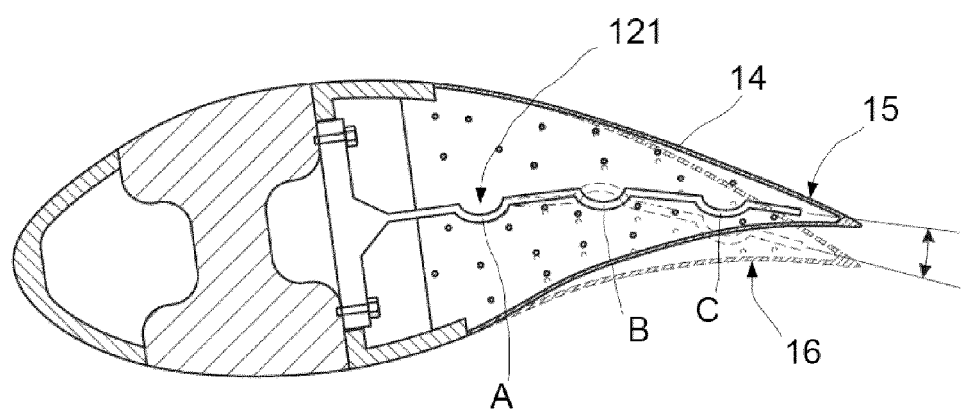
FIG. 2 shows two stable states for the blade of FIG. 1.

FIG. 2 shows two stable states for the blade of FIG. 1: an initial shape indicated by dashed lines 16 where the DTE is non-deformed and a deformed shape indicated by solid lines 15 where the DTE is deformed.

Each dimple 121 (only three A, B and C are visible) may have a first stable position protruding from one side of the sheet surface 120. For example dimple A and C may have a first stable position protruding from a top side of the sheet surface 120, i.e. with their convex side pointing towards a suction side 30 of the blade and a second stable position protruding from a bottom side of the sheet surface, i.e. with their convex side pointing towards a pressure side 40 of the blade. Also dimple B may have a first stable position (dashed line) protruding from a top side of the sheet surface 120, i.e. with its convex side pointing towards a suction side 30 of the blade and a second stable position (solid line) protruding from a bottom side of the sheet surface, i.e. with its convex side pointing towards a pressure side 40 of the blade. In the example shown in FIG. 2 when changing between the two stable states the only dimple that changes from the first stable position to the second stable position is dimple B.

Because of the changed position of the dimple, the tension applied to the portions of the sheet between the dimples changes and therewith the curvature of the sheet.

As further shown in FIG. 2, once at least one dimple is changed from one stable position to the other stable position, an outer shape of the DTE 10 changes from a first neutral stable position 16 to a second stable position 15, for example a negative position, i.e. a position in which the blade generates less lift than in the neutral position.

Figure 3:
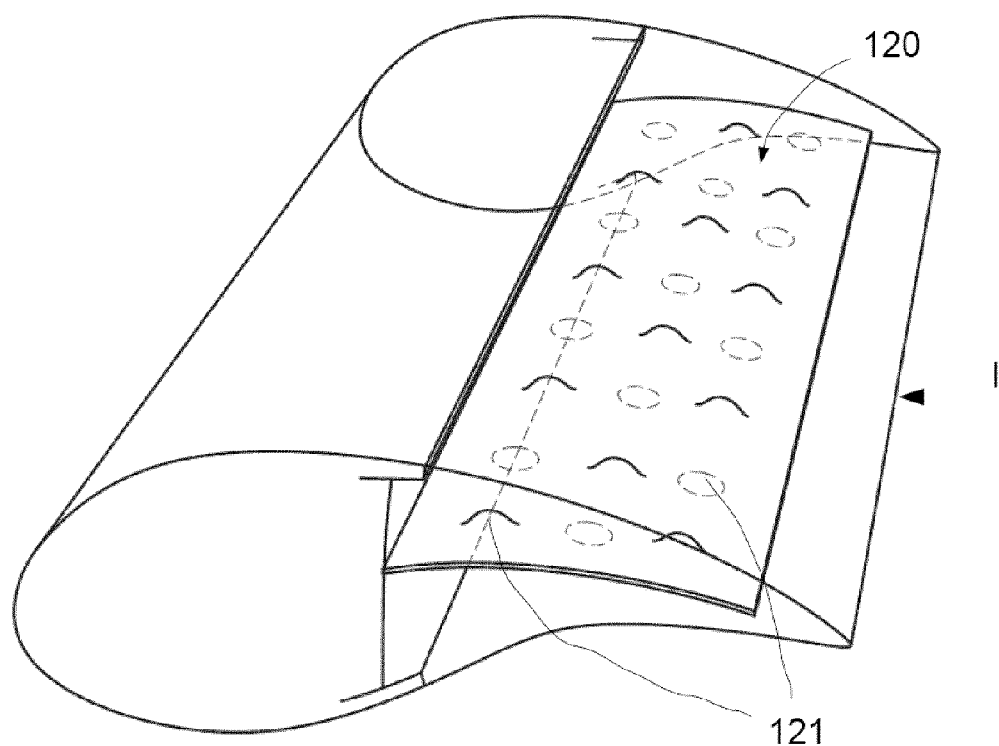
FIG. 3 shows a perspective of a wind turbine blade portion according to an embodiment.

FIG. 3 shows a perspective of a wind turbine blade portion according to an embodiment. FIGS. 3 shows that the dimples 121 may be distributed in a matrix configuration along the multistable sheet surface 120. In this example eight rows and three lines have been depicted although a different amount of dimples and a different distribution may also be foreseen. In alternative embodiments the dimples may be distributed in a single line or describing circular paths. Other distributions may also be foreseen.

A matrix configuration of bistable elements e.g. dimples gives rise to a wide variety of blade shape configurations depending on the dimples that have been activated. As the dimples change position, the tension applied by the dimples to the sheet changes both in the chordwise and the spanwise direction. The twist of blade sections and also the curvature (camber line) may be effectively controlled.

Figure 4:
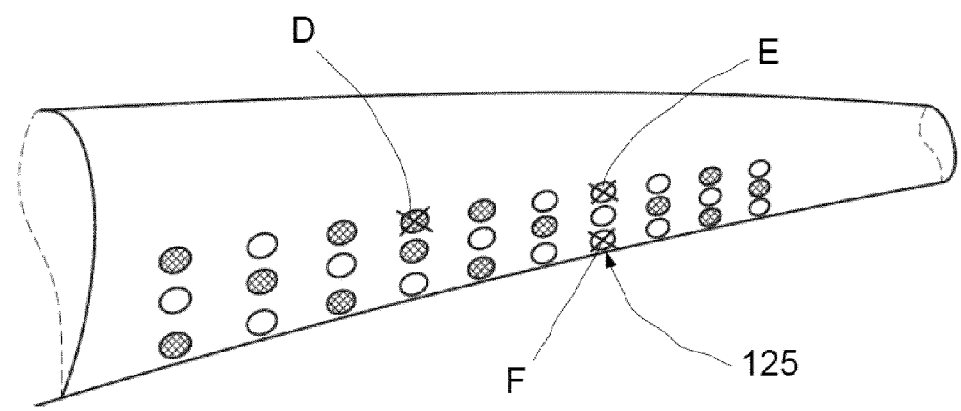
FIG. 4 shows a top view of a wind turbine blade portion according to an embodiment.
Figure 5:
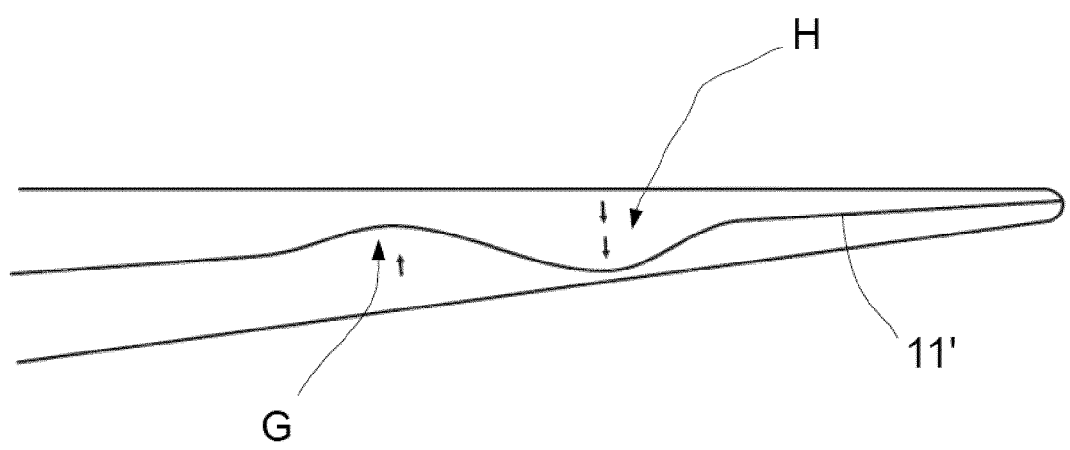
FIG. 5 shows a side view of FIG. 4.

FIG. 4 shows a top view of a wind turbine blade portion according to an embodiment viewed from suction side. FIG. 5 shows a side view of FIG. 4, viewed from the trailing edge (arrow I of FIG. 3). FIG. 5 shows one possible deformed trailing edge 11', resulting from the activation of one or more of the dimples shown in FIG. 4. For example the dimples marked with a cross 125 in FIG. 4. These changes may be done at different moments in time or simultaneously depending on circumstances. When the deformed trailing edge 11' is obtained at different moments in time, a progressive change in the blade shape can be obtained. This may be suitable for tackling different wind speeds conditions.

In the example shown in FIGS. 4 and 5, in a first moment in time, a negative DTE angle (shown by arrow G) is attained by changing dimple D provided at substantially 40% of the span. If the twist of this section is changed, this clearly also affects the portion of the blade in between this dimple and the blade tip.

Later on, in a second moment in time, a positive DTE angle (shown by arrow H) may be attained by changing for example dimples E and F provided closer to the blade tip. Clearly, many other options are available.

Using a multistable sheet substantially as hereinbefore described a large number of combinations of "flap angle" and/or chord length of the blade may be available to adjust lift (and drag and pitch moment) to adapt to changing wind loads.

In some embodiments, the dimples are or comprise piezoelectric elements. In these cases, a multiplexer connectable to a power supply and adapted to supply energy to the dimples (bistable elements) may further be provided. In these cases, power supply may be provided e.g. in the blade root portion or in the hub and information from the controller may inform the multiplexer which dimple has to be activated.

Other embodiments may use a pneumatic or oil-hydraulic system with actuators adapted to change the bistable elements from one stable position to the other stable position.

In some cases, one or more bistable elements may further comprise a force multiplying system. This may be of special interest in those cases activating the bistable elements by a pneumatic system as these systems sometimes may not provide enough force for changing the bistable elements from one stable position to the other stable position. The force multiplying system may comprise a lever mechanism, an inherent asymmetry in the dimples, a force/energy accumulator.

In some cases, a blade substantially as hereinbefore described may further be provided with a control system for controlling the bistable elements. In others, the control system may be provided in other parts of the wind turbine.

In some embodiments, the deformable trailing edge may extend the total length of the blade or it may extend at least one section of the blade, e.g. in particular the portion closest to a blade tip, for example approximately the outer third of the blade. In other cases, a plurality of deformable trailing edge sections may also be provided.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

What is claimed is:

1. A wind turbine comprising:
   one or more wind turbine blades comprising a deformable trailing edge section having a multistable sheet comprising a plurality of bistable elements,
   wherein the bistable elements are dimples provided along a surface of the multistable sheet, each dimple having a first stable position protruding from one side of the surface and a second stable position protruding from the other side of the surface,
   wherein the multistable sheet is attached in a cantilever manner to a structural portion of the wind turbine blade and extends in a chordwise direction, and
   wherein the multistable sheet is connected to a skin of the wind turbine blade such that upon changing one or more bistable elements of the plurality of bistable elements from one of the first stable position or the second stable position to the other of the first stable position or the second stable position, a shape of the deformable trailing edge section changes; and
   a control system for controlling the plurality of bistable elements.

2. The wind turbine according to claim 1, further comprising a multiplexer connectable to a power supply and adapted to supply energy to the bistable elements.

3. The wind turbine according to claim 1, wherein the bistable elements are or comprise piezoelectric elements.

4. The wind turbine according to claim 1, further comprising a pneumatic or oil-hydraulic system adapted to change the one or more bistable elements from the one of the first stable position or the second stable position to the other of the first stable position or the second stable position.

5. The wind turbine according to claim 4, wherein the one or more bistable elements further comprise a force multiplying system.

6. The wind turbine according to claim 1, further comprising a control system for controlling the bistable elements.

7. The wind turbine according to claim 1, wherein the deformable trailing edge section is provided at or near a tip of the wind turbine blade.

8. The wind turbine according to claim 1, wherein the deformable trailing edge section extends along one third of the total length of the wind turbine blade.

9. The wind turbine according to claim 1, wherein the deformable trailing edge section spans in the chordwise direction from between 50% and 75% of a chord line of a blade section to a trailing edge of the wind turbine blade.

10. The wind turbine according to claim 1, wherein the skin or at least portions of the skin are made of a flexible material.

11. The wind turbine according to claim 1, wherein the multistable sheet is connected to the skin of the wind turbine blade by an anisotropic material.

12. The wind turbine according to claim 1, wherein the multistable sheet is connected to the skin of the wind turbine blade by a foam material.

13. A method of controlling loads on the one or more wind turbine blades of the wind turbine according to claim 1, wherein the method comprises measuring average loads on the wind turbine blade at time intervals and changing the one or more bistable elements of the plurality of bistable elements from the one of the first stable position or the second stable position to the other of the first stable position or the second stable previously presented position as a function of the measured average loads.

14. A method of controlling loads on the one or more wind turbine blades of the wind turbine according to claim 1, wherein the method comprises measuring average wind conditions at time intervals and changing the one or more bistable elements of the plurality of bistable elements from the one of the first stable position or the second stable position to the other of the first stable position or the second stable position as a function of the measured average wind conditions, wherein measuring average wind conditions comprise detecting wind shear, wind veer and/or situations of layered winds.

* * * * *